(12) United States Patent
Burns et al.

(10) Patent No.: US 8,312,975 B2
(45) Date of Patent: Nov. 20, 2012

(54) INTEGRATED HYDRAULIC CONTROL SYSTEM FOR AWD VEHICLE

(75) Inventors: Timothy M. Burns, Elbridge, NY (US); Hsing Hua Fan, Baldwinsville, NY (US); Donald Zucaro, Ridgewood, NJ (US)

(73) Assignee: MAGNA Powertrain USA, Inc., Troy, MI (US)

( * ) Notice: Subject to any disclaimer, the term of this patent is extended or adjusted under 35 U.S.C. 154(b) by 738 days.

(21) Appl. No.: 12/510,444

(22) Filed: Jul. 28, 2009

(65) Prior Publication Data
US 2010/0029440 A1 Feb. 4, 2010

Related U.S. Application Data

(60) Provisional application No. 61/084,414, filed on Jul. 29, 2008.

(51) Int. Cl.
*B60W 10/02* (2006.01)
*B60W 10/18* (2012.01)
*B60K 23/08* (2006.01)

(52) U.S. Cl. ...................... 192/13 R; 192/221
(58) Field of Classification Search ............... 192/13 R, 192/12 C
See application file for complete search history.

(56) References Cited

U.S. PATENT DOCUMENTS

| | | | | |
|---|---|---|---|---|
| 6,361,126 | B1 * | 3/2002 | Pueschel et al. | 303/114.3 |
| 7,216,753 | B2 * | 5/2007 | Bruder | 192/218 |
| 7,367,436 | B2 * | 5/2008 | Gratzer | 192/13 R |
| 7,694,790 | B2 * | 4/2010 | Gratzer | 192/13 R |
| 2005/0116537 | A1 * | 6/2005 | Zalewski et al. | 303/139 |
| 2006/0169564 | A1 * | 8/2006 | Krisher et al. | 192/85 AA |

* cited by examiner

*Primary Examiner* — Richard M. Lorence
(74) *Attorney, Agent, or Firm* — Harness, Dickey & Pierce, P.L.C.

(57) ABSTRACT

A hydraulic control system for a vehicle includes a brake control unit having a mechanically actuated master cylinder and an electric motor driven pump. The master cylinder and the pump are each adapted to separately provide pressurized fluid to a brake cylinder. A hydraulically actuated drive coupling selectively transfers torque between rotatable input and output shafts. The rotatable output shaft is adapted to drive a vehicle wheel. The hydraulic control unit is in receipt of pressurized fluid from the pump. The hydraulic control unit includes a valve moveable between a first position where the drive coupling is in communication with the pressurized fluid and torque is transferred by the coupling and a second position where the pressure of the fluid in the cavity is reduced to reduce the torque transferred by the coupling.

21 Claims, 4 Drawing Sheets

INTEGRATED HYDRAULIC CONTROL SYSTEM FOR AWD VEHICLE

CROSS-REFERENCE TO RELATED APPLICATIONS

This application claims the benefit of U.S. Provisional Application No. 61/084,414, filed on Jul. 29, 2008. The entire disclosure of the above application is incorporated herein by reference.

BACKGROUND

The present disclosure relates generally to hydraulic systems for vehicles and, more particularly, to an integrated hydraulic control system for an all wheel drive vehicle.

Demand for vehicles having anti-lock braking systems, traction control systems and electronic stability control functionalities has increased over time. Vehicles equipped with each of these systems typically have a first motor and first pump positioned in a hydraulic circuit to provide the requisite brake pressure needed for traction control. A relatively complex electronic control module is used for processing vehicle signals and actuating the first motor as well as a number of valves to achieve the desired vehicle response. An all wheel drive coupling may also be used to improve traction as well as the vehicle handling. At least one system includes an all wheel drive coupling actuated by an active hydraulic control system including a second motor and a second pump. The all wheel drive system also requires an electronic control module to process vehicle systems and actuate the second motor and a second series of valves. As such, at least some of the currently known vehicles equipped with a traction control system that selectively actuates the brakes and another traction control system that selectively actuates an all wheel drive coupling include redundant components. The resultant vehicle may be burdened with an increased system cost and weight.

SUMMARY

The present disclosure provides a hydraulic control system for an all wheel drive vehicle having primary and secondary drivelines as well as an engine transferring power to the primary driveline. The control system includes a clutch adapted to selectively transfer torque from one of the engine and the primary driveline to the secondary driveline. A piston is slidably positioned within a cavity to apply an actuation force to the clutch. A hydraulic control unit is adapted to receive pressurized fluid from an anti-lock braking system. The hydraulic control unit includes a first valve selectively isolating the pressurized fluid of the anti-lock braking system from the cavity and a second valve moveable between a first position where the cavity is in fluid communication with the first valve and a second position where the cavity is adapted to be in fluid communication with a fluid reservoir of the anti-lock braking system.

Furthermore, a hydraulic control system for an all wheel drive vehicle having primary and secondary drivelines as well as an engine transferring power to the primary driveline includes a brake control unit, an all wheel drive coupling and a hydraulic control unit. The brake control unit includes an electric motor driven pump selectively providing pressurized fluid to a first brake cylinder. The all wheel drive coupling is adapted to selectively transfer torque from one of the engine and the primary driveline to the secondary driveline and includes a piston positioned within a cavity to apply an actuation force to a clutch. The hydraulic control unit is in receipt of pressurized fluid from the pump and includes a first valve selectively isolating the pressurized fluid from the cavity. A second valve is moveable between a first position where the cavity is in fluid communication with the first valve and a second position where the cavity is in fluid communication with a fluid reservoir of the brake control unit.

Additionally, the present disclosure provides a hydraulic control system for a vehicle including a brake control unit having a mechanically actuated master cylinder and an electric motor driven pump. The master cylinder and the pump are each adapted to separately provide pressurized fluid to a brake cylinder. A hydraulically actuated drive coupling selectively transfers torque between rotatable input and output shafts. The rotatable output shaft is adapted to drive a vehicle wheel. The hydraulic control unit is in receipt of pressurized fluid from the pump. The hydraulic control unit includes a valve moveable between a first position where the drive coupling is in communication with the pressurized fluid and torque is transferred by the coupling and a second position where the pressure of the fluid in the cavity is reduced to reduce the torque transferred by the coupling.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
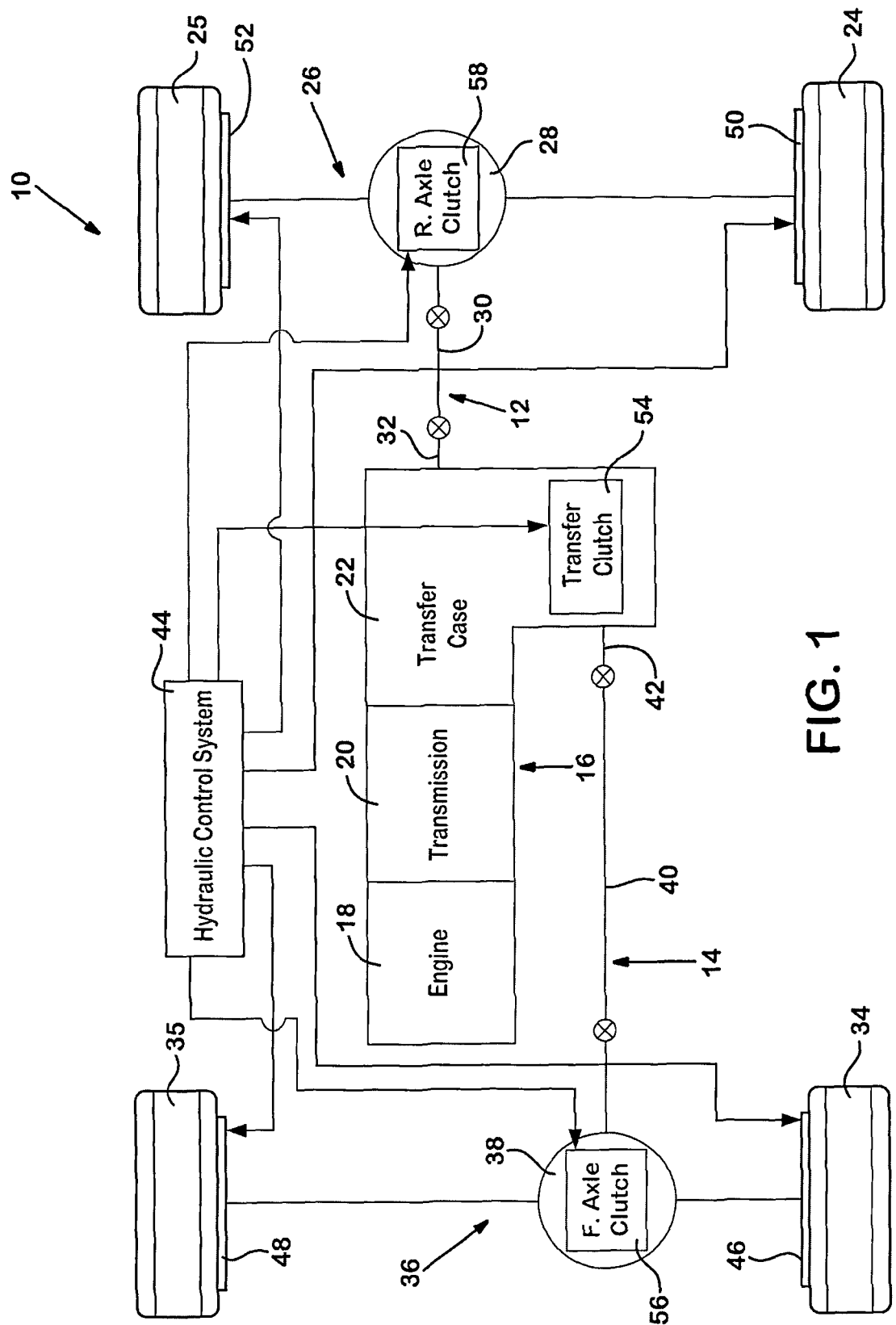
FIG. 1 is a schematic depicting a vehicle equipped with an integrated hydraulic control system in accordance with the teachings of the present disclosure.

The following description is merely exemplary in nature and is not intended to limit the present disclosure, application, or uses. It should be understood that throughout the drawings, corresponding reference numerals indicate like or corresponding parts and features.

The present disclosure relates to a combination braking and traction control system for adaptively controlling the brakes of a vehicle as well as a torque transfer mechanism that modulates the torque transferred from a first rotary member to a second rotary member. The torque transfer mechanism finds particular application in power transmission devices for use in motor vehicle drivelines such as, for example, an on-demand clutch in a transfer case or in-line torque coupling, a biasing clutch associated with a differential assembly in a transfer case or a drive axle assembly, or as a shift clutch in a multi-speed automatic transmission. Thus, while the present disclosure provides particular arrangements for use in specific driveline applications, it should be understood that the arrangements shown and described are merely exemplary.

With particular reference to FIG. 1 of the drawings, a drivetrain 10 for a four-wheel drive vehicle is shown. Drivetrain 10 includes a primary driveline 12, a secondary driveline 14, and a powertrain 16 for delivering rotary tractive power (i.e., drive torque) to the drivelines. In the particular arrangement shown, primary driveline 12 is the rear driveline while secondary driveline 14 is the front driveline. Powertrain 16 includes an engine 18, a multi-speed transmission 20, and a power transmission device, hereinafter referred to as transfer case 22. Rear driveline 12 includes a pair of rear wheels 24 and 25 connected at opposite ends of a rear axle assembly 26 having a rear differential 28 coupled to one end of a rear prop shaft 30, the opposite end of which is coupled to a rear output shaft 32 of transfer case 22. Likewise, front driveline 14 includes a pair of front wheels 34 and 35 connected at opposite ends of a front axle assembly 36 having a front differential 38 coupled to one end of a front prop shaft 40, the opposite end of which is coupled to a front output shaft 42 of transfer case 22.

With continued reference to the drawings, drivetrain 10 is shown to further include an integrated hydraulic control system 44 for providing anti-lock braking functions as well as traction control functions. In this regard, drivetrain 10 is equipped with a pair of front brakes 46 and 48 for decelerating front wheels 34 and 35 as well as a pair of rear brakes 50 and 52 for decelerating rear wheels 24 and 25. Each brake 46, 48, 50, 52 includes a hydraulically-powered brake cylinder 46a, 48a, 50a, 52a, respectively, for applying the brakes.

Additionally, integrated hydraulic control system 44 includes an all wheel drive (AWD) coupling 53 having one or more clutches that may be selectively actuated for transferring drive torque from engine 18 to one or more of the wheels. In one example, AWD coupling 53 includes a transfer clutch 54 positioned within transfer case 22 to selectively transfer drive torque from rear output shaft 32 to front output shaft 42 for establishing part-time and on-demand four-wheel drive modes. Furthermore, front axle assembly 36 may be equipped with a front axle biasing clutch 56 for selectively varying the torque distribution delivered from front prop shaft 40 to front wheels 34 and 35. Similarly, rear axle assembly 26 may include a rear axle biasing clutch 58 for selectively varying the torque distribution delivered from rear prop shaft 30 to rear wheels 24 and 25. It should be appreciated that a vehicle may be equipped with one or more of these torque transfer clutches functioning as AWD coupling 53 without departing from the scope of the present disclosure. Each of these torque transfer clutches may include at least one multi-plate friction clutch assembly and, as will be detailed, a hydraulically-powered actuator for controlling engagement of the friction clutch assemblies.

Figure 2:
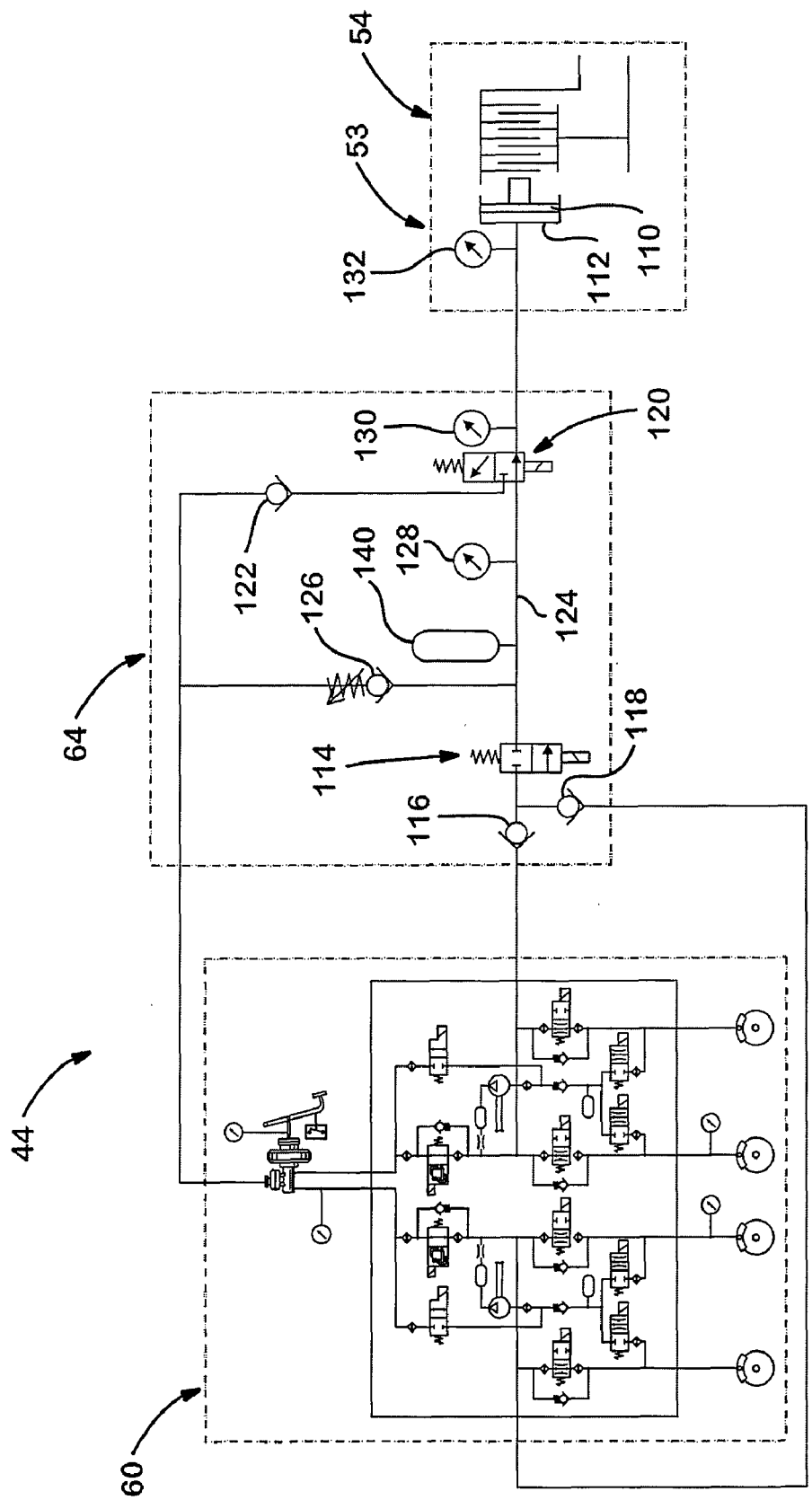
FIG. 2 is a hydraulic schematic representing the components of the hydraulic control system.
Figure 3:
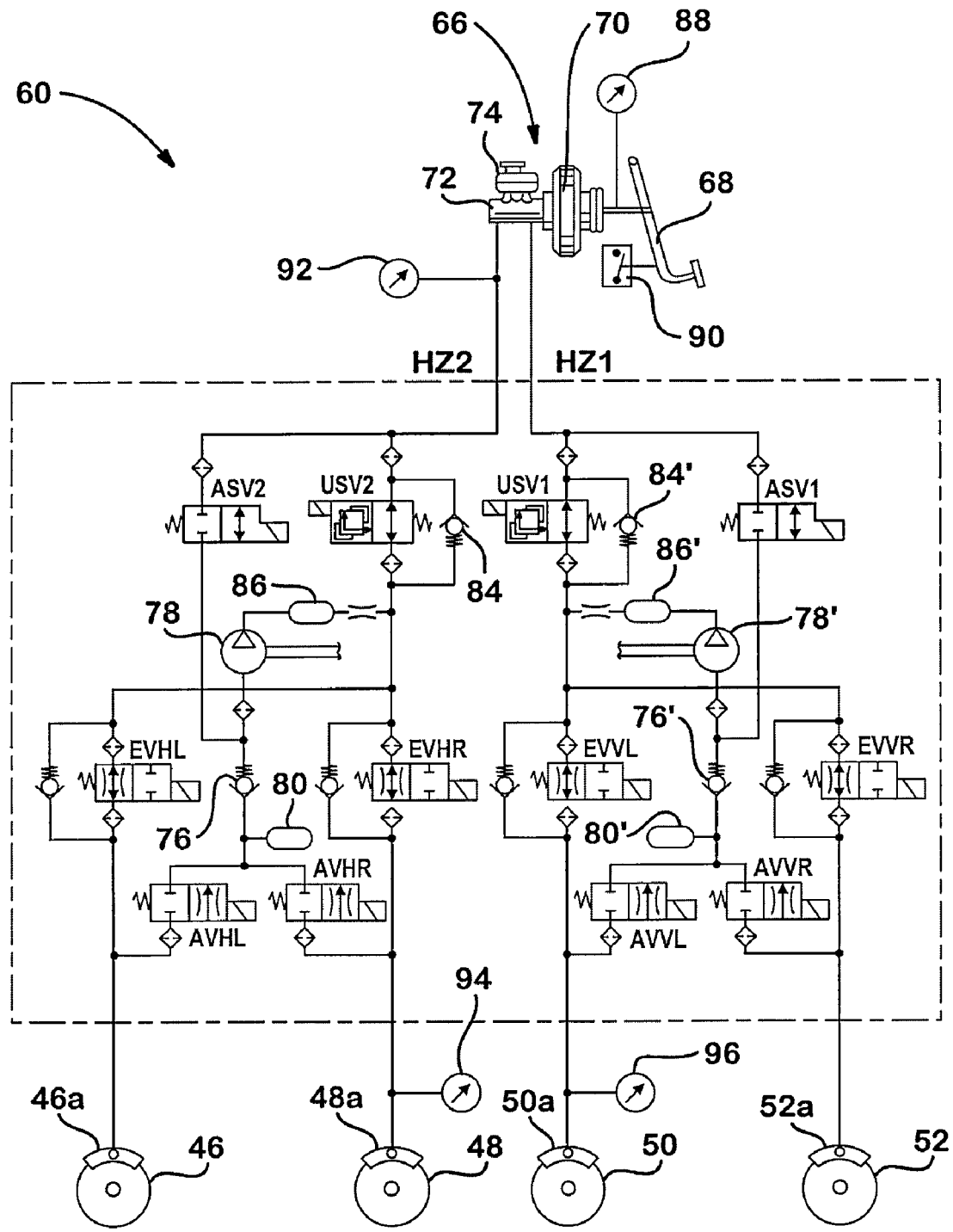
FIG. 3 is a schematic of the brake control unit portion of the hydraulic control system.
Figure 4:
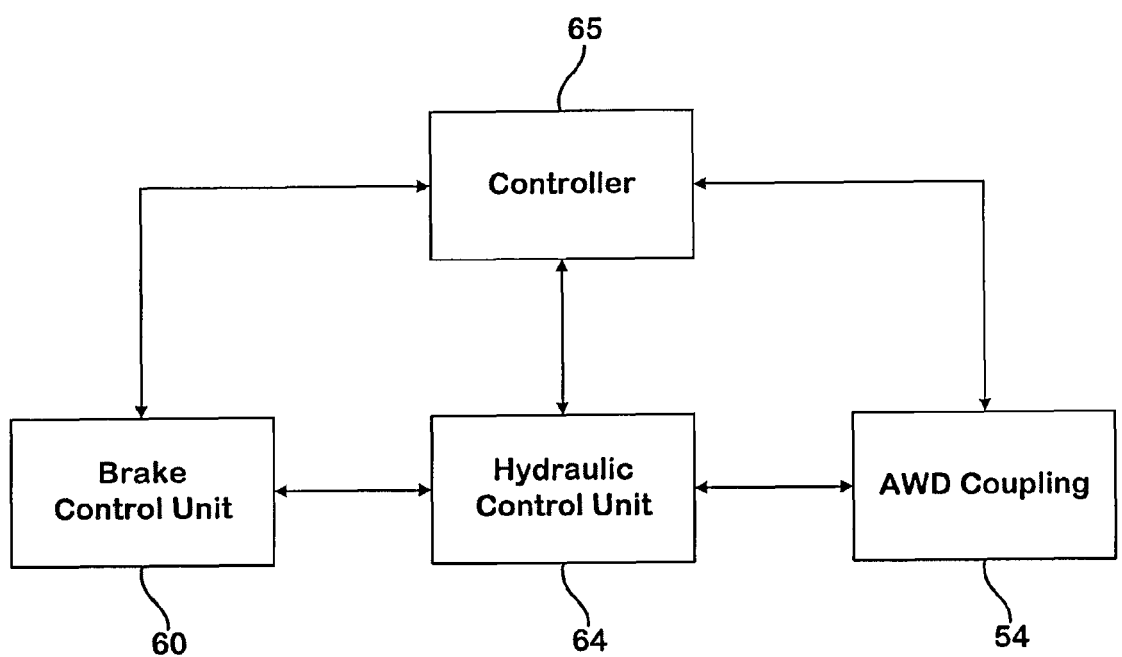
FIG. 4 is a schematic depicting a controller in communication with various portions of the hydraulic control system.

FIG. 2 provides a hydraulic schematic of integrated hydraulic control system 44. System 44 includes a brake control unit 60 and AWD coupling 53 placed in communication with one another by a hydraulic control unit 64. Integrated hydraulic control system 44 includes a controller 65 for coordinating operation of brake control unit 60, AWD coupling 53 and hydraulic control unit 64. Brake control unit 60 functions to apply one or more of brakes 46, 48, 50, 52 during standard braking operations, anti-lock braking system operations, traction control systems operations and electronic stability control operations that include actuating at least one of the brakes of the vehicle identified later as ABS/TCS/ECS. AWD coupling 53 functions to assist vehicle traction control as well. However, AWD coupling 53 does not actuate any of the brakes but functions by transferring torque across transfer clutch 54, front axle biasing clutch 56 and/or rear axle biasing clutch 58 to vary the torque distribution to wheels 24, 25, 34, 35. Pressurized fluid to actuate these clutches is provided by brake control unit 60. Hydraulic control unit 64 coordinates the transfer of pressurized fluid between brake control unit 60, hydraulic control unit 64 and AWD coupling 53.

Brake control unit 60 includes multiple sources of pressurized hydraulic fluid to selectively actuate the wheel brake cylinders. One of the sources includes a conventional brake actuator 66 having a brake pedal 68 manually engaged by a user. Brake pedal 68 applies a compressive force to a brake booster 70. Brake booster 70 amplifies the force provided to a master cylinder 72. A reservoir 74 stores hydraulic fluid at low pressure for use in brake control unit 60.

Master cylinder 72 is represented as a dual cavity device providing pressurized fluid output along a first line identified as HZ1 and a second line identified as HZ2. Should a rupture or blockage occur in one of the pressurized fluid lines, the other fluid line provides a backup. In this vein, brake control unit 60 may include redundant components. Like components will be identified with similar reference numerals including a prime suffix.

Each of wheel brake cylinders 46a-52a communicates with an outlet valve (AV) as well as with an inlet valve (EV). The outlet valve allocated to the wheel brake cylinder 46a is denoted by AVHL, the outlet valve allocated to the wheel brake cylinder 48a by AVHR, the outlet valve allocated to the wheel brake cylinder 50a by AVVL, and the outlet valve allocated to the wheel brake cylinder 52a by AVVR. The inlet valve allocated to the wheel brake cylinder 46a is denoted by EVHL, the inlet valve allocated to the wheel brake cylinder 48a by EVHR, the inlet valve allocated to the wheel brake cylinder 50a by EVVL, and the inlet valve allocated to the wheel brake cylinder 52a by EVVR.

Other sources of pressurized fluid include electric motor driven pumps 78 and 78'. The outlet valves AV are moveable to a working position brought about by magnetic excitation to connect the wheel brake cylinders via check (one-way) valves 76, 76' to one of return pumps 78 or 78'. In their unexcited basic position, they block this connection. Incorporated into the connection between each outlet valve AV and its associated pump is a low-pressure accumulator or reservoir 80, 80'.

In their unexcited basic position, the inlet valves EV render possible an unhindered passage between the wheel brake cylinders and switch-over valves, USV1 and USV2. In the working position brought about by magnetic excitation, the inlet valves EV block this passage. Allocated to separate pairs of the wheel brake cylinders are aspirator valves ASV1 and ASV2, respectively, and switch-over valves USV1 and USV2, respectively. They furnish the braking supply pressure in the event of ABS/TCS/ECS operation.

Switch-over valves USV1 and USV2 are disposed in connecting lines between the inlet valves EV and brake fluid reservoir 74. In their unexcited basic position, switch-over valves USV1 or USV2 are open. In the unexcited basic position, the aspirator valves ASV are blocked. The aspirator valves ASV are connected between the brake fluid reservoir 74 and the suction-side connection of the pumps 78, 78' and, thus, the outlet valves.

Check valves 84, 84' having a flow-through direction toward the inlet valves EV are connected in parallel to the switch-over valves USV. Dampers or accumulators 86, 86' are disposed in each case between the delivery-side outlet of pumps 78, 78' and the switch-over valves USV1, USV2.

A sensor 88 supplies a signal indicating the position of or force applied to brake pedal 68. Also provided is a brake light switch 90, which activates the brake lights upon actuation of the brakes. Another sensor 92 is arranged in the line between master brake cylinder 72 and switch-over valves USV1 or USV2. Sensor 92 supplies a signal which characterizes the pressure in the master brake cylinder. In addition, sensors 94 and 96 can also be provided to supply signals which characterize the pressure in the wheel brake cylinders. Depending on the specific embodiment, only one or a plurality of the sensors 88, 92, 94 or 96 can be provided.

During normal operation, each of the solenoid valves ASV, USV, EV, AV are in their unexcited basic position. When brake pedal 68 is actuated by the driver, the brake fluid flows through the switch-over valves USV and the inlet valves EV into the corresponding wheel brake cylinders. If a locking tendency of a wheel is detected, the corresponding inlet valve EV is brought into its blocking position and the corresponding outlet valve AV into its working position. In this position, brake fluid is siphoned by pumps 78 or 78' from this wheel brake cylinder.

In traction control operation, the aspirator valves ASV and the switch-over valves USV are brought into their working position and pumps 78, 78' are activated. By this means, pressure is built up in the wheel brake cylinders for as long as the inlet and outlet valves are in their basic position.

If the inlet valve EV and the outlet valve AV are in their basic position, then pressure is built up in the wheel brake cylinder. If the inlet valve is in its working position and the outlet valve in its neutral position, the pressure prevailing in the wheel brake cylinder remains at a constant value. If the outlet valve AV and the inlet valve EV are in their working position, then pressure is reduced in the wheel brake cylinder. Further details regarding operation of brake control unit 60 are described in U.S. Pat. No. 5,727,852 incorporated herein by reference.

It should be appreciated that while brake control unit 60 is depicted as containing two motor driven pumps 78, 78', a single motor driven pump may provide the requisite pressurized fluid to wheel brake cylinders 46a-52a. Furthermore, pumps 78, 78' or the sole pump of brake control unit 60 is the pressure generation source for AWD coupling 53 as well.

AWD coupling 53 includes an axially moveable piston 110 acting on transfer clutch 54. Piston 110 is positioned within cavity 112 in select receipt of pressurized fluid. When pressurized fluid is provided to cavity 112, piston 110 applies a compressive force to transfer clutch 54 to transfer drive torque from rear output shaft 32 to front output shaft 42.

Hydraulic control unit 64 is operable to selectively supply pressurized fluid to cavity 112. Hydraulic control unit 64 includes a first solenoid valve 114 biased to a normally closed position restricting pressurized fluid from entering hydraulic control unit 64. First solenoid valve 114 may be electrically actuated to allow a flow of fluid from brake control unit 60 into hydraulic control unit 64. A first check valve 116 and a second check valve 118 restrict fluid from passing from hydraulic control unit 64 toward brake control unit 60. A second solenoid valve 120 is biased toward a first position where pressurized fluid is restricted from entering cavity 112 but fluid is allowed to exit cavity 112 and return to reservoir 74. A check valve 122 restricts fluid from returning from reservoir 74 and entering hydraulic control unit 64.

Second solenoid valve 120 may be electrically actuated to shift the valve to a second position where cavity 112 is in fluid communication with a line 124 plumbed in communication with first solenoid valve 114. A pressure relief valve 126 interconnects line 124 and reservoir 74. Pressure sensors 128, 130 and 132 are positioned at various locations to output signals indicative of the fluid pressure at particular locations within integrated hydraulic control system 44, as will be described in greater detail.

In operation, it may be desirable to control integrated hydraulic control system 44 such that pressurized fluid is not provided to cavity 112 and torque is not transferred across AWD coupling 53 such as when pressurized fluid is provided to any one of brake cylinders 46a-52a. It may be desirable to move first solenoid valve 114 to its closed position during either operator application of the brakes by depressing brake pedal 68 or application of the brakes by ABS/TCS/ECS. In this manner, pressurized fluid is restricted from entering hydraulic control unit 64 and torque will not be transferred across AWD coupling 53 during braking.

It is contemplated that motor driven pumps 78, 78' may be utilized for the all wheel drive function whenever pressurized fluid is not being provided to a brake cylinder. To ensure that unintended braking does not occur when using pumps 78 and 78' to operate AWD coupling 53, valves EVVL, EVVR, EVHL and EVHR of brake control unit 60 are moved to their closed positions to prevent the brake calipers from being actuated. Additionally, valves AVVL, AVVR, AVHL and AVHR may be closed to further prevent any unintended braking due to leakage past the EV valves.

To operate integrated hydraulic control system 44 in a mode where torque is transferred across AWD coupling 53, valves ASV1, ASV2, USV1 and USV2 are controlled in a similar manner as when a ABS/TCS/ECS event occurs within brake control unit 60. Particularly, valves ASV1 and ASV2 are opened to allow fluid to be drawn from master cylinder 72. Valves USV1 and USV2 are closed. The USV valves act as proportional pressure control valves.

In one embodiment, the pressurized fluid provided to cavity 112 may be modulated as a function of controlling the current to the USV valves. However, the capacities of the pumps may not be sufficient to allow direct control of AWD coupling 53 and still meet the required response times and accuracy requirements. If the latter condition is the case, other control schemes may be implemented.

For example, an optional accumulator 140 is depicted in fluid communication with line 124. Accumulator 140 may be used to store pressurized hydraulic fluid provided by motor driven pumps 78, 78'. The time required to provide pressurized fluid to cavity 112 may be reduced based on the use of accumulator 140. Furthermore, a smooth clutch apply torque trace may result due to eliminating the pumps as a possible source of pressure ripple. Accumulator 140 further reduces the likelihood of conflict between braking functions and torque transfer of AWD coupling 53 when pressurized fluid is required for both functions. Although rare, some drivers manipulate the brake and throttle of the car at the same time to achieve various dynamic responses from the vehicle. When accumulator 140 is plumbed into integrated hydraulic control system 44, USV valves are actuated with enough current to charge the accumulator 140 to a target pressure. The target fluid pressure within accumulator 140 may be significantly lower than the peak pressure provided to brake cylinders 46a-52a.

A pressure sensor 128 outputs a signal indicative of the fluid pressure within accumulator 140. This signal may be provided to controller 65. The USV valves, first solenoid valve 114 and motor driven pumps 78, 78' are actuated to maintain the target pressure within accumulator 140.

Pressure sensor 130 can be used to monitor the actuating pressure applied to piston 110. Controller 65 may utilize the signal output from pressure sensor 130 for closed loop control and improved accuracy of the quantity of torque transferred by AWD coupling 53. Other methods, including current control, may be used to control the clutch pressure without the use of sensor 130.

In the event that AWD coupling 53 resides a great distance from hydraulic control unit 64, line losses and changes in viscosity of the working fluid may affect the accuracy of the coupling control system. Therefore, optional sensor 132 may be added to output a signal more accurately indicative of the fluid pressure acting on piston 110. Controller 65 may utilize the information output from pressure sensor 132 in addition to or instead of the data provided by pressure sensor 130.

In the instance that driveline 10 is equipped with multiple driveline or AWD clutches, hydraulic control system 44 may be easily modified to include additional pistons moveable to actuate the clutches. Additional valves may be plumbed to selectively supply pressurized fluid to each piston.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A hydraulic control system for an all wheel drive vehicle having primary and secondary drivelines as well as an engine transferring power to the primary driveline, the control system comprising:
    a clutch adapted to selectively transfer torque from one of the engine and the primary driveline to the secondary driveline;
    a piston slidably positioned within a cavity to apply an actuation force to the clutch; and
    a hydraulic control unit adapted to receive pressurized fluid from an anti-lock braking system, the hydraulic control unit including a first valve selectively isolating the pressurized fluid of the anti-lock braking system from the cavity a second valve moveable between a first position where the cavity is in fluid communication with the first valve and a second position where the cavity is adapted to be in fluid communication with a fluid reservoir of the anti-lock braking system, a first check valve adapted to restrict fluid flow from the first valve toward the anti-lock brake system, a second check valve adapted to restrict fluid flow from the anti-lock brake system toward the second valve, and a pressure relief valve adapted to permit fluid flow from the cavity toward the fluid reservoir when the fluid pressure exceeds a predetermined value.

2. The hydraulic control system of claim 1 further Including a controller to control the position of the first and second valves to restrict torque transfer through the clutch when the anti-lock braking system is actuated to deliver pressurized fluid to a brake cylinder.

3. The hydraulic control system of claim 1 further Including a brake control unit including a motor driven pump operable to selectively provide pressurized fluid to a brake cylinder.

4. The hydraulic control system of claim 3 wherein the brake control unit includes a brake pedal to transfer force to a master cylinder which outputs pressurized fluid to the brake cylinder.

5. The hydraulic control system of claim 1 wherein the hydraulic control unit includes an accumulator adapted to be charged with pressurized fluid from the anti-lock braking system.

6. The hydraulic control system of claim 5 wherein the pressurized fluid from the accumulator acts on the piston when the second valve is in the first position.

7. The hydraulic control system of claim 1 wherein the clutch transfers torque when the piston is acted on by the pressured fluid passing through each of the first and second valves.

8. A hydraulic control system for an all wheel drive vehicle having primary and secondary drivelines as well as an engine transferring power to the primary driveline, the control system comprising:
    a brake control unit including an electric motor driven pump selectively providing pressurized fluid to a first brake cylinder;
    an all wheel drive coupling adapted to selectively transfer torque from one of the engine and the primary driveline to the secondary driveline and including a piston positioned within a cavity to apply an actuation force to a clutch;
    a hydraulic control unit in receipt of pressurized fluid from the pump, the hydraulic control unit including a first valve selectively isolating the pressurized fluid from the cavity and a second valve moveable between a first position where the cavity is in fluid communication with the first valve and a second position where the cavity is in fluid communication with a fluid reservoir of the brake control unit; and
    a controller to control the position of the first and second valves to restrict torque transfer through the all wheel drive coupling when the first brake cylinder is in receipt of pressurized fluid.

9. The hydraulic control system of claim 8 wherein the brake control unit includes a brake pedal to transfer force to a master cylinder, the master cylinder outputting pressurized fluid to the first brake cylinder.

10. The hydraulic control system of claim 9 wherein the brake control unit includes first, second, third and fourth inlet valves to selectively provide pressurized fluid from the pump to the first brake cylinder as well as second, third and fourth brake cylinders, respectively.

11. The hydraulic control system of claim 10 wherein the brake control unit includes first, second, third and fourth outlet valves respectively associated with the first, second, third and fourth brake cylinders to reduce the fluid pressure therein.

12. The hydraulic control system of claim 8 further including a check valve adapted to restrict fluid flow from the first valve toward the pump.

13. The hydraulic control system of claim 12 further including another check valve adapted to restrict fluid flow from the pump toward the second valve.

14. The hydraulic control system of claim 8 wherein the hydraulic control unit includes an accumulator charged with pressurized fluid from the pump.

15. The hydraulic control system of claim 14 wherein the pressurized fluid from the accumulator acts on the piston when the second valve is in the first position.

16. The hydraulic control system of claim 8 wherein the hydraulic control unit further includes a first check valve adapted to restrict fluid flow from the first valve toward the second check valve adapted to restrict fluid flow from the fluid reservoir toward the second valve, and a pressure relief valve adapted to permit fluid flow from the cavity toward the fluid reservoir when the pressure of the fluid exceeds a predetermined value.

17. The hydraulic control system of claim 16 wherein the controller is in receipt of a signal indicative of the pressure acting on the piston and controls the first and second valves to maintain a predetermined pressure on the piston.

18. The hydraulic control system of claim 8 wherein the brake control unit and the hydraulic control unit are positioned in a common valve body.

19. The hydraulic control system of claim 10 wherein the first, second, third and fourth inlet valves are closed during actuation of the all wheel drive coupling.

20. A hydraulic control system for a vehicle, the control system comprising:
- a brake control unit including a mechanically actuated master cylinder and an electric motor driven pump, each adapted to separately provide pressurized fluid to a brake cylinder;
- a rotatable input shaft;
- a rotatable output shaft adapted to drive a vehicle wheel;
- a hydraulically actuated drive coupling adapted to selectively transfer torque between the input and output shaft;
- a hydraulic control unit in receipt of pressurized fluid from the pump, the hydraulic control unit including a valve moveable between a first position where the drive coupling is in communication with the pressurized fluid and torque is transferred by the coupling and a second position where the pressure of the fluid in the cavity is reduced to reduce the torque transferred by the coupling; and
- a controller to control the position of the valve to restrict the transfer of torque through the drive coupling when the brake cylinder is in receipt of pressurized fluid from the brake control unit.

21. A hydraulic control system for a motor vehicle having a powertrain and first and second drivelines, the hydraulic control system comprising:
- an anti-lock brake system operable to provide pressurized fluid to a brake cylinder;
- a hydraulically-actuated coupling adapted to selectively transmit drive torque from one of the powertrain and the first driveline to the second driveline;
- a hydraulic control unit adapted to receive pressurized fluid from the anti-lock brake system, the hydraulic control unit including a first valve operable to selectively isolate pressurized fluid of the anti-lock brake system from a hydraulic actuator associated with the hydraulically-actuated coupling, and a second valve operable to selectively place the hydraulic actuator in fluid communication with one of the first valve and a fluid reservoir of the anti-lock brake system; and
- a controller operable to control actuation of the first and second valves to inhibit the transmission of drive torque through the coupling when the brake cylinder is supplied with pressurized fluid.

* * * * *